United States Patent [19]

Shrout et al.

[11] Patent Number: 4,979,906
[45] Date of Patent: Dec. 25, 1990

[54] BUSWAY WEATHERPROOF HOUSING

[75] Inventors: Larry T. Shrout, Zebulon, N.C.; Allan E. Slicer, Brookville, Ind.

[73] Assignee: Square D Company, Palatine, Ill.

[21] Appl. No.: 460,698

[22] Filed: Jan. 4, 1990

[51] Int. Cl.⁵ ............................................. H01R 4/60
[52] U.S. Cl. ................................. 439/213; 174/88 B; 439/210
[58] Field of Search ............... 439/207, 210, 212, 213; 174/68.2, 88 B

[56] References Cited

U.S. PATENT DOCUMENTS 3,647,937  3/1972  Jorgensen ..................... 174/88 B
3,852,515  12/1974 Jorgensen et al. ............ 174/88 B X
4,272,646  6/1981  Carlson ......................... 174/88 B Primary Examiner—Eugene F. Desmond
Attorney, Agent, or Firm—Larry I. Golden

[57] ABSTRACT

A housing for enclosing a weatherproof busway joint. The housing includes a pair of end pieces which are attached to and sealed to a busway enclosure near the joint. The busway enclosure houses, supports, and protects a plurality of electrical conductors enclosed therein and extends through an opening about in the center of the end piece. A pair of joint covers enclose the joint area between the two end pieces. A material which forms the sealing medium between the end pieces and the busway enclosures and between the joint covers and the end pieces. The weatherproof joint covers are placed between the end pieces of two adjoining busway sections such that the joint area is completely enclosed and sealed by the end piece and joint covers to prevent the ingress of water.

6 Claims, 4 Drawing Sheets

4,979,906

BUSWAY WEATHERPROOF HOUSING

FIELD OF THE INVENTION

This invention relates to an electrical distribution system designed for outdoor use and more specifically to an improved method of enclosing the joint between two adjoining sections of weatherproof busway.

BACKGROUND OF THE INVENTION

The present invention represents an improvement over the electrical distribution system disclosed in U.S. Pat. No. 4,820,177 issued Apr. 11, 1989 which may be referenced for description of common features. The aforementioned patent is assigned to the same assignee as the instant invention and is hereby incorporated by reference.

SUMMARY OF THE INVENTION

This invention is a weatherproof housing for busway joints. The busway includes a first plurality of electrical conductors, a second plurality of electrical conductors, means for connecting the first plurality of electrical conductors and the second plurality of electrical conductors, and a first enclosure which houses, supports, and protects the first plurality of conductors from contact or physical damage. The first enclosure or one segment of the first plurality of electrical conductors is used as a ground. The busway further includes a second enclosure which houses, supports, and protects the second plurality of conductors from contact or physical damage. The second enclosure or one segment of the second plurality of electrical conductors is used as a ground.

The housing comprises a first end piece having an opening about in the center thereof through which the first plurality of electrical conductors and the first enclosure extend, and a second end piece having an opening about in the center thereof through which the second plurality of electrical conductors and the second enclosure extend. The housing further includes a first cover attached to the first and second end pieces, and a second cover attached to the first and second end pieces so that the first and second plurality of electrical conductors are located between and are completely enclosed by the first and second end pieces and the first and second covers. The housing also includes means located between the end pieces, the covers, and the enclosures for sealing the housing so that the housing prevents water from reaching the first and second plurality of electrical conductors.

Other features and advantages of the invention will become apparent to those skilled in the art upon review of the following detailed description, claims and drawings.

Figure 1:
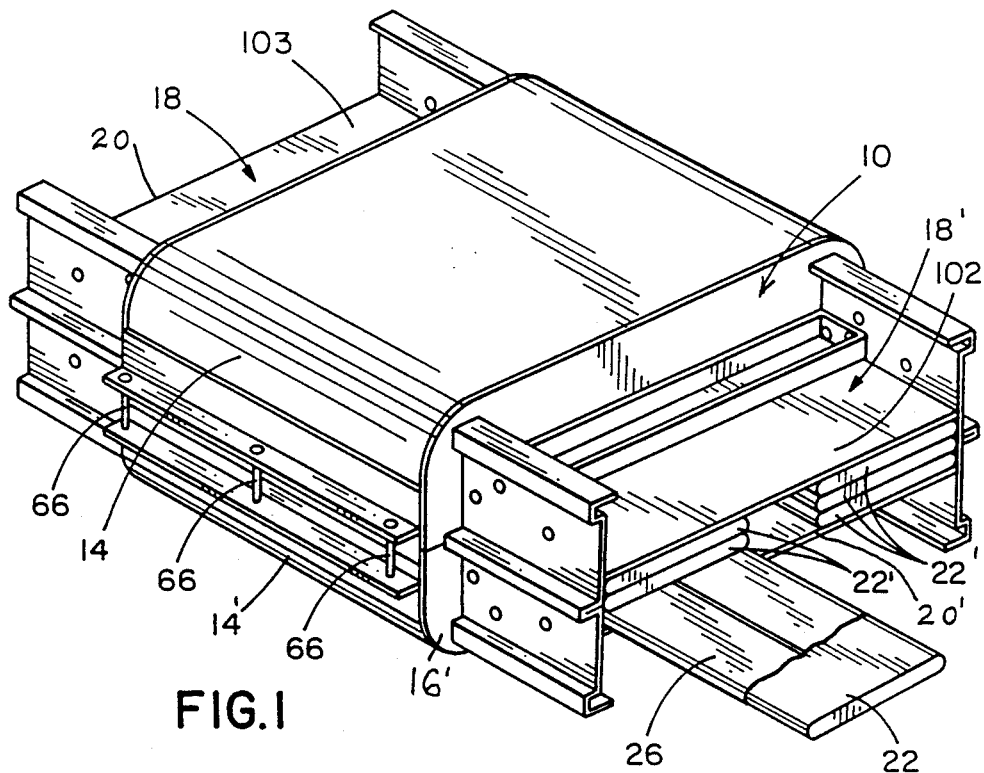
FIG. 1 is a perspective view showing an assembled weatherproof housing for a busway joint, which housing embodies various of the features of the invention.

Before one embodiment of the invention is explained in detail, it is to be understood that the invention is not limited in its application to the details of construction and the arrangement of components set forth in the following description or illustrated in the drawings. The invention is capable of other embodiments and if being practiced or being carried out in various ways. Also, it is to be understood that the phraseology and terminology used herein is for the purpose of description and should not be regarded as limiting.

DESCRIPTION OF THE PREFERRED EMBODIMENT

A housing 10 for enclosing and protecting the joint area between two adjoining sections 18 and 18' of weatherproof busway 12 from the ingress of water is illustrated in the drawings. As illustrated in FIG. 1, the housing 10 is comprised of a first and second end piece 16 and 16', respectively, and a first and second cover 14 and 14', respectively, which vary in width depending on the width of the weatherproof busway section.

Each of the weatherproof busway sections 18 and 18' includes a separate one of a first and a second enclosure 20 and 20', respectively, which houses, supports, and protects a separate one of a first and a second plurality of electrical conductors 22 and 22', respectively. One of each of the busway enclosures or one of the conductors is used as an electrical ground. Each of the plurality of electrical conductor 22 and 22' is sheathed in separate polyethylene terephthalate tubes 26 which electrically insulate the conductors from its enclosures and from other conductors. The polyethylene terephthalate tubes 26 enclose the full length of each conductor except for a short segment at each respective busway section end 30 and 34.

The busway 12 further includes means for connecting the first electrical conductors 22 of the first busway section end 30 to the electrical conductors 22' of the second busway section end 34. More particularly, the connecting means includes at least one bolt 38, one nut 42, and two spring washers 46. Two flat plates 50 made of a conducting material are used to connect each electrical conductor of the first busway section end 30 to like electrical conductors of the second busway section end 34. A plurality of molded insulators 52 are used to separate the electrical conductors in the joint. Such means of joining busway sections is described in U.S. Pat. No. 4,820,177.

The joint covers 14 and 14' are generally elongated and C-shaped with longitudinally extending edges 54 and 54' on each side. Each of the covers 14 and 14' includes a pair of L-shaped flanges 58 and 58', each of which is attached to a different one of the longitudinally extending edges 54 and 54'. Each of the cover flanges 58 and 58' faces its corresponding flange on the other housing cover.

Figure 2:
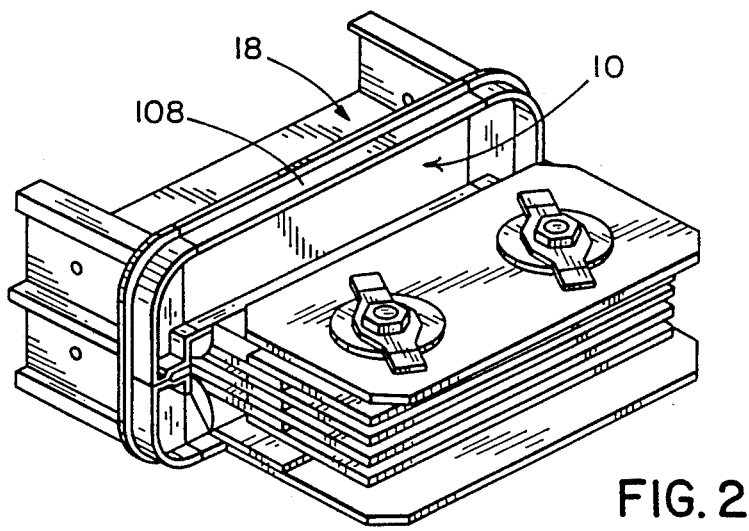
FIG. 2 is a perspective view of a busway joint area showing one end piece installed and the placement of sealing means.
Figure 4:
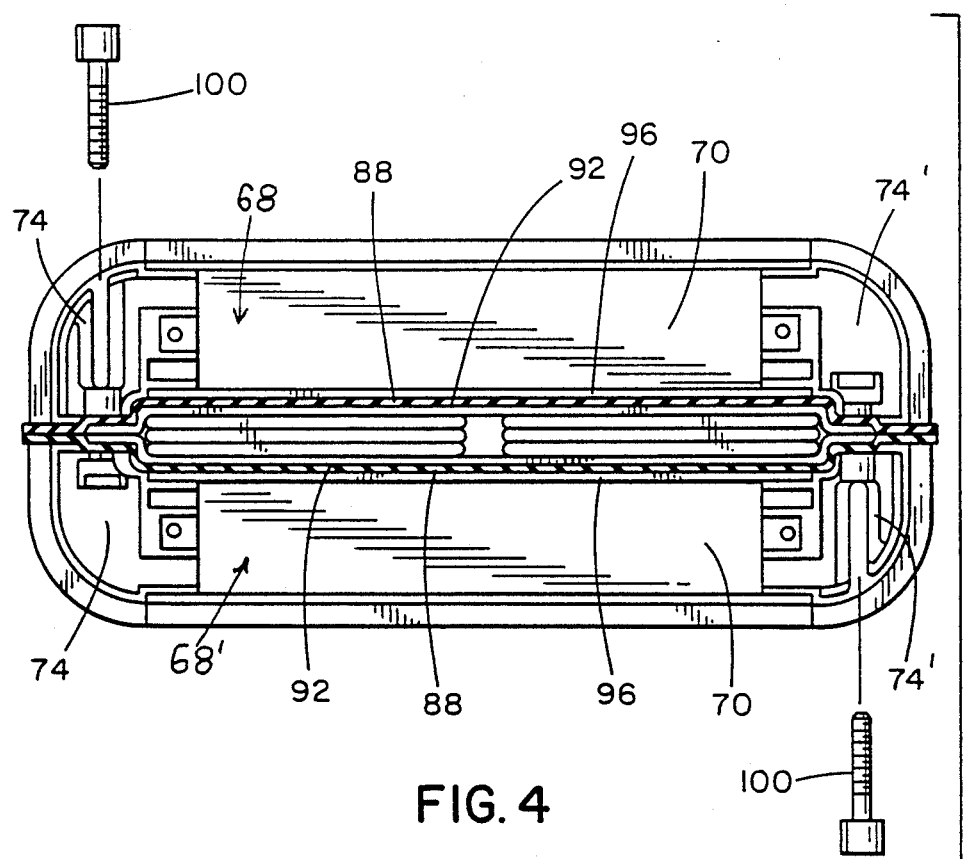
FIG. 4 is a cross-sectional view of the busway joint area showing an installed end piece in accordance with the present.
Figure 5:
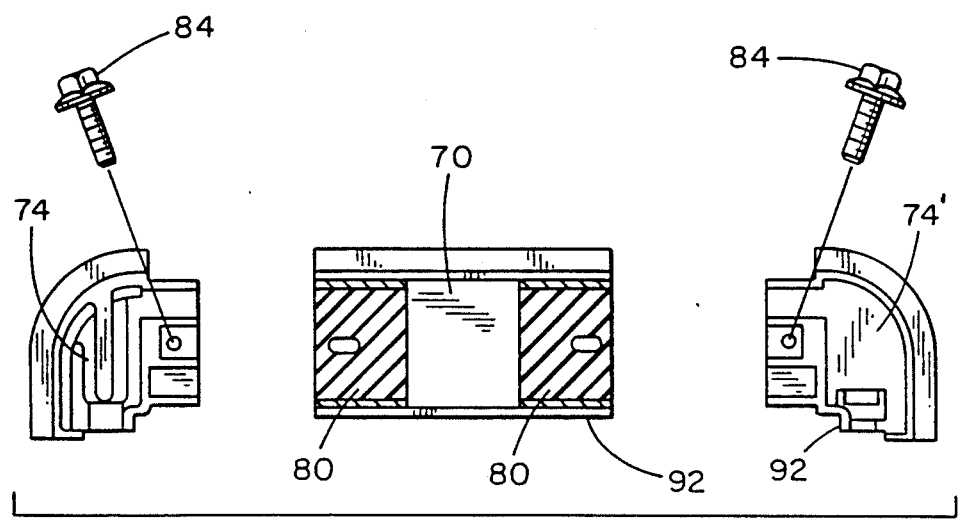
FIG. 5 is an exploded view of one half of an end piece of the present invention.
Figure 6:
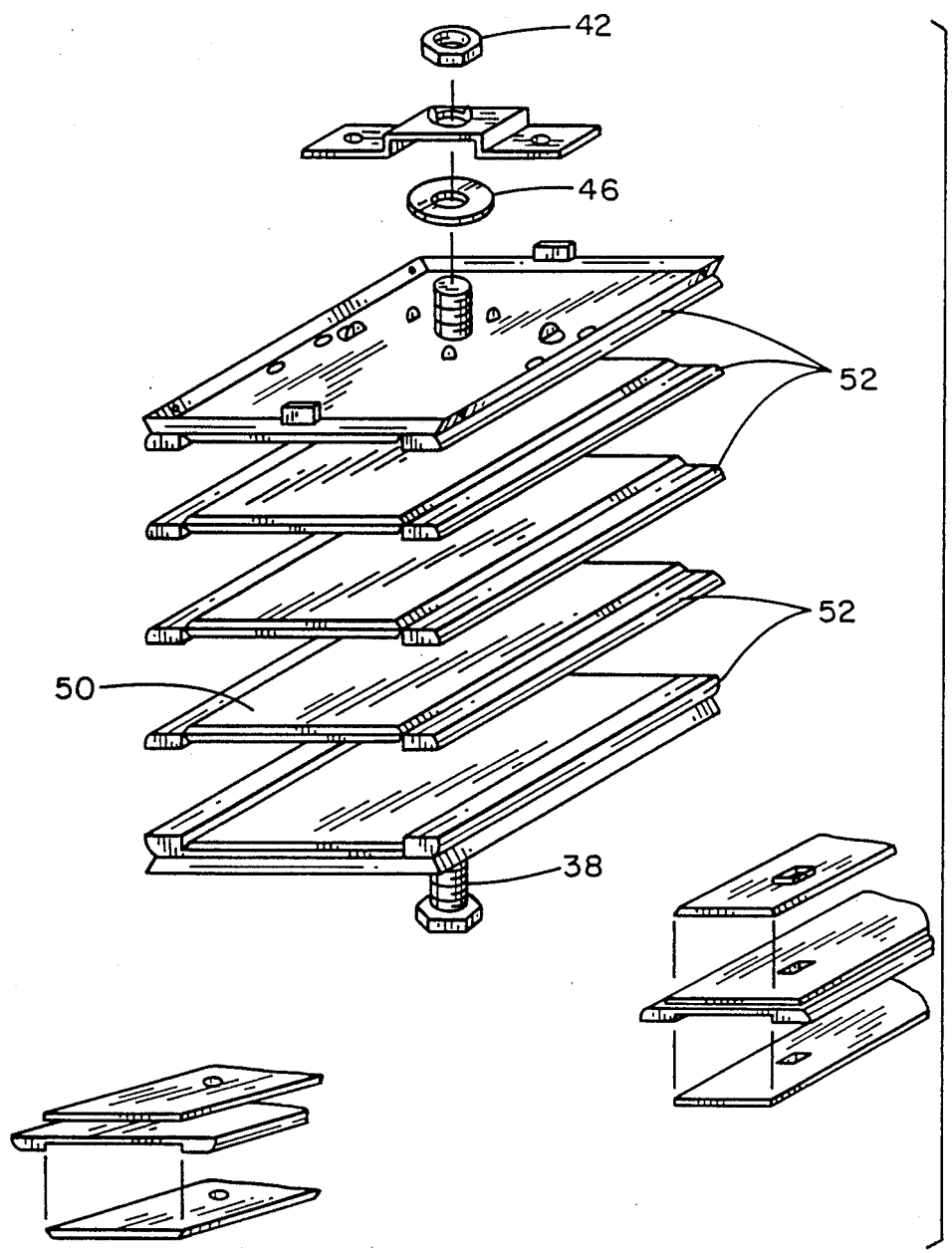
FIG. 6 is an exploded view of the means for electrically connecting one busway section to an adjoining busway section.

As illustrated in FIG. 2, each of the end pieces 16 and 16' is generally oval in shape and is attached to a respective busway section 18 or 18' at the joint area. Each end piece (see FIG. 4) is comprised of two half pieces 68 and 68'. Each half piece includes three parts. One is a straight generally C-shaped channel 70 which varies in length with the width of the busway section, and two curved generally C-shaped channels 74 and 74'.

The six parts of each of the end pieces 16 and 16' are sealed to prevent the passage of water by compressing a rubber material 80 between the mating surfaces of the parts. A plurality of screws 84 are then used to connect the six parts of the end piece together. Each assembled end piece is sealed to its respective weatherproof busway enclosure by compressing a rubber material 88 between an inside surface 92 of each end piece and an outside surface of its respective busway section. Two screws 100 are used to attach each end piece to its busway enclosure and also to provide the force necessary to compress the rubber material 88 between the end piece and the busway enclosure.

Figure 3:
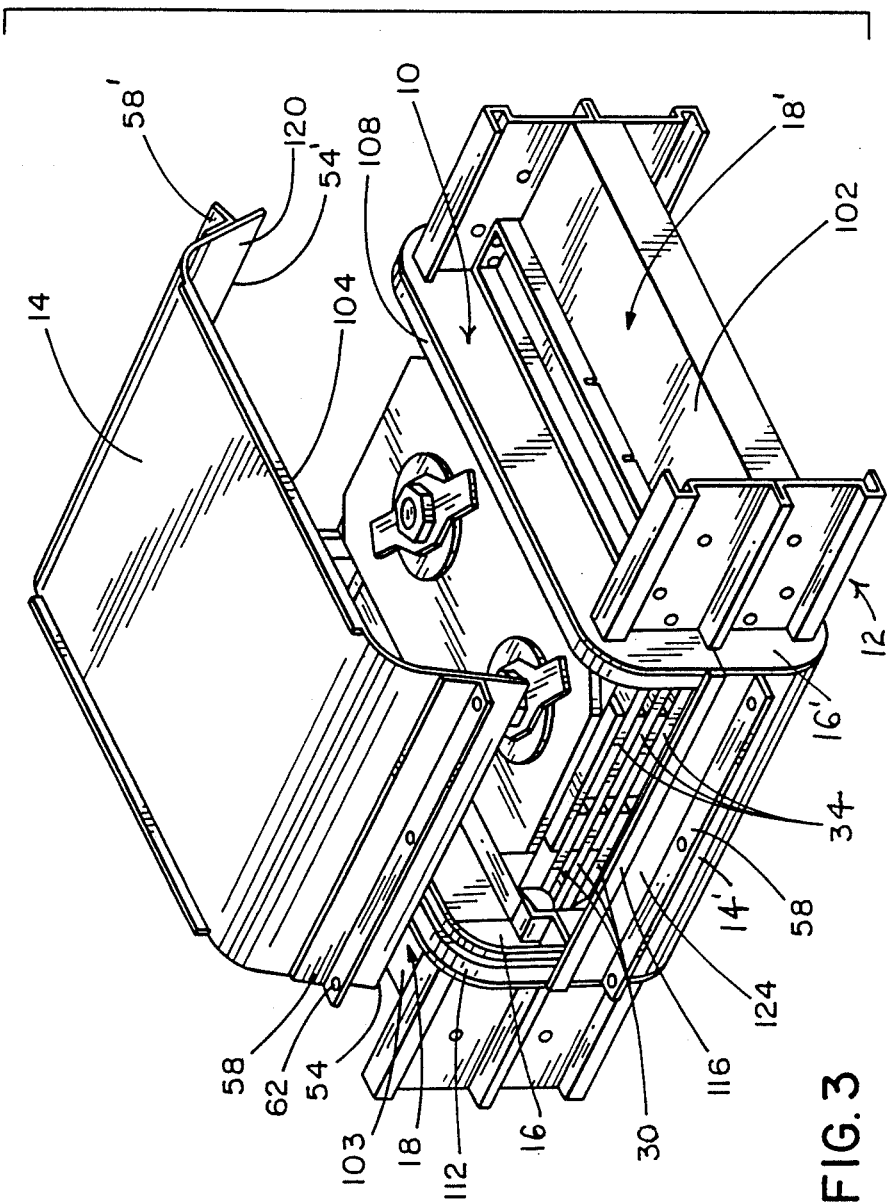
FIG. 3 is a perspective view of the busway joint area showing the joint cover installation and placement of the sealing means in accordance with the present invention.

As illustrated in FIG. 3, each of the weatherproof joint covers 14 and 14' are connected to the spaced apart end pieces 16 and 16' in a manner such that an inside surface 104 of the joint covers 14 and 14' will seal against an outside surface 108 of the end pieces. This sealing is accomplished by compressing a rubber material 112 between the two surfaces.

The longitudinally extending edges 54 and 54' of the two joint covers are also sealed against each other by compressing a rubber material 116 between an inside surface 120 of the longitudinally extending edge of one cover 14 and an outside surface 124 of the longitudinally extending edge of the other cover 14'.

Each of the cover flanges 58 and 58' includes means for securing the two covers together. The securing means is in the form of a plurality of flange apertures 62 which receive a plurality of screws 66 to pull the two joint covers 14 and 14' tightly together. The sealing of the joint covers against the end pieces and each other is accomplished when the screws 66 pull the covers down tightly against the end pieces compressing the rubber material 112 and pull the covers down tightly against each other along the longitudinally extending edges compressing the rubber material 116.

Various features of the invention are set forth in the following claims.

We claim:

1. A weatherproof housing for busway joints, the busway including
    a first plurality of electrical conductors,
    a second plurality of electrical conductors,
    means for connecting said first plurality of electrical conductors and said second plurality of electrical conductors,
    a first enclosure which houses, supports, and protects said first plurality of conductors from contact or physical damage, wherein the first enclosure or one segment of said first plurality of electrical conductors is used as a ground,
    a second enclosure which houses, supports, and protects said second plurality of conductors from contact or physical damage, wherein the second enclosure or one segment of said second plurality of electrical conductors is used as a ground,
    said housing comprising a first end piece having an opening about in the center thereof through which said first plurality of electrical conductors and the first enclosure extend,
    a second end piece having an opening about in the center thereof through which said second plurality of electrical conductors and the second enclosure extend,
    a first cover attached to said first and second end pieces,
    a second cover attached to said first and second end pieces so that the first and second plurality of electrical conductors are located between and are completely enclosed by said first and second end pieces and said first and second covers, and
    means located between said end pieces, said covers, and the enclosures for sealing said housing so that said housing prevents water from reaching said first and second plurality of electrical conductors.

2. A weatherproof housing for busway joints in accordance with claim 1 wherein said first and second end pieces are generally oval in shape, and
    wherein each of said end pieces comprises a plurality of straight generally C-shaped channels forming the straight portions of the oval,
    a plurality of curved generally C-shaped channels forming the rounded portions of the oval,
    means for attaching said straight channels to said curved channels, and
    means for sealing between said straight channels and said curved channels so that water is prevented from passing through the mating area of said channels.

3. A weatherproof housing for busway joints in accordance with claim 1 wherein said first and second end pieces each include an inside surface, and
    wherein the first and second enclosures each include an outside surface in opposed relationship to a different one of said end piece inside surfaces, and
    wherein said housing further comprises means for attaching said end pieces to the enclosures, and
    wherein said housing seal means comprises means for sealing each of said end piece inside surfaces to its opposed enclosure outside surface to prevent water from passing between said end pieces and the enclosures.

4. A weatherproof housing for busway joints in accordance with claim 1 wherein said first and second end pieces have an outside surface, and
    wherein each of said first and second covers is generally elongated and C-shaped in cross-section and has a laterally extending inside surface in opposed relationship to a different one of each of said first and second end piece outside surfaces, and
    wherein said housing sealing means further includes means for sealing between said first and second cover inside surfaces and said first and second end piece outside surfaces to prevent the passage of water between said covers and said end pieces.

5. A weatherproof housing for busway joints in accordance with claim 4 wherein one of said first and second covers includes two parallel longitudinally extending edges, each having an outside surface, and the other of said first and second covers includes two parallel longitudinally extending edges, each having an inside surface overlapping and in opposed relationship to a different one of each of said cover longitudinally extending edge outside surfaces, and
    wherein said housing further includes means for sealing between said overlapping and opposed first and second cover longitudinally extending edge surfaces to prevent the passage of water between said covers.

6. A weatherproof housing for busway joints in accordance with claim 5 wherein said first and second covers further include an L-shaped flange permanently attached to each of said longitudinally extending edges, and wherein said housing further includes means for connecting said flanges of said first cover to said flanges of said second cover to pull said covers tightly against said first and second end pieces.

* * * * *